United States Patent [19]
Thiede et al.

[11] Patent Number: 5,129,595
[45] Date of Patent: Jul. 14, 1992

[54] FOCAL PLANE ARRAY SEEKER FOR PROJECTILES

[75] Inventors: Edwin C. Thiede, Minnetonka; Charles R. Seashore, Edina; J. Allen Cox, New Brighton, all of Minn.

[73] Assignee: Alliant Techsystems Inc., Edina, Minn.

[21] Appl. No.: 725,196

[22] Filed: Jul. 3, 1991

[51] Int. Cl.$^5$ ............................................. F41G 7/26
[52] U.S. Cl. ............................................. 244/3.16
[58] Field of Search ................................... 244/3.16

[56] References Cited

U.S. PATENT DOCUMENTS

| | | | |
|---|---|---|---|
| 3,872,308 | 3/1975 | Hopson et al. | 250/347 |
| 3,944,167 | 3/1976 | Figler et al. | 244/3.16 |
| 3,974,985 | 8/1976 | Campbell et al. | 244/3.16 |
| 4,093,154 | 6/1978 | McLean | 244/3.16 |
| 4,187,783 | 2/1980 | Campoli et al. | 102/521 |
| 4,220,972 | 9/1980 | Geokezas et al. | 358/166 |
| 4,240,596 | 12/1980 | Winderman et al. | 244/3.16 |
| 4,396,878 | 8/1983 | Cole et al. | 244/3.15 |
| 4,490,724 | 12/1984 | Bickman | 343/765 |
| 4,508,293 | 4/1985 | Jones | 244/3.15 |
| 4,519,041 | 5/1985 | Fant et al. | 364/552 |
| 4,561,104 | 12/1985 | Martin | 382/8 |
| 4,615,496 | 10/1986 | Pinson | 244/3.16 |
| 4,654,622 | 3/1987 | Foss et al. | 338/14 |
| 4,675,532 | 6/1987 | Carson | 244/3.16 |
| 4,752,694 | 6/1988 | Hegel, Jr. et al. | 250/578 |
| 4,868,871 | 9/1989 | Watson, III | 382/1 |

*Primary Examiner*—Charles T. Jordan
*Attorney, Agent, or Firm*—Haugen and Nikolai

[57] ABSTRACT

The invention provides a relatively low cost, high resolution precision target acquisition and tracking system capable of operation on nonspinning ballistic munition projectiles, or the like. The system includes an imaging IR sensor head which is preferably gimbal mounted and utilizes an ambient temperature operating, densely packed, two dimensional focal plane array of electromagnetic radiation infrared sensitive (IR) sensors. The array is adapted to operate in a staring mode and a small amount of thermal stabilization is provided. Signal processing electronics are included with stabilizing self-calibrating non-uniformity compensation processing capabilities. This is combined with a high speed, high resolution real-time image processing system to extract target features and which operates with a discriminating, tracking and control system which identifies, targets and initiates tracking to impact on a selected target.

14 Claims, 4 Drawing Sheets

FOCAL PLANE ARRAY SEEKER FOR PROJECTILES

The invention was made with Government support under Contract No. DAAA21-87-C-1046 awarded by the Department of the Army. The Government has certain rights in the invention.

BACKGROUND OF THE INVENTION

1. Field of the Invention

The present invention is directed generally to a radiant energy based target acquisition and tracking seeker for a missile or munition projectile of a class of such ballistic projectiles and, more particularly, to an improved seeker system which incorporates an uncooled, infrared-sensitive, two-dimensional focal plane detector array in conjunction with signal processing electronics. The focal plane detector array accomplishes high resolution target imaging and is capable of operation in a staring mode.

2. Related Art

It is known to incorporate various types of radiation sensitive systems into the nose cones of guided missiles and other types of ballistic projectiles for use in target acquisition, tracking and homing. Some of these systems employ radiant energy detecting multiple targets of interest and/or discriminating between a plurality of targets of interest having different energy levels or spectral characteristics.

One such system which utilizes a vidicon to obtain a video image as a second order discriminant and as a source of guidance data in conjunction with an infrared (IR) hotspot detection technique is illustrated and described in U.S. Pat. No. 4 615 496 to Pinson. That system uses a central processing unit (CPU) to compare vidicon generated images with predefined stored criteria based on size, temperature and distribution of multispectral characteristics. Tracking data based on the target positioned in the field of view (FOV) are used to fly the missile to the target. The system uses an infrared seeker to first detect hotspots in the field of view prior to video data processing which is used to image a selected field of view based on the detection of an hotspot. The hotspot is indicated by infrared energy levels above a preselected established threshold at a known frequency.

A further hotspot detecting radiation tracking apparatus is shown in U.S. Pat. No. 3 944 167 to Figler, et al. That system uses multiple electro-optic arrays to define inner and outer fields of view, together with IR bandpass filters, to discriminate between true and false targets.

While such devices have met with some degree of success, they all require mechanical rotating filter and/or chopping devices to permit rapid alternate exposure of the sensing system to incoming radiation and background for comparison. This limits their application to relatively low acceleration ("low g") environments such as launched ballistic missiles or the like. Most have IR systems that require cryogenic cooling to operate. The need for precision mechanization and cryogenic cooling add undesirable cost to the device. In addition, imaging resolution quality is generally less than desirable for proper target discrimination except in very high cost systems.

Infrared detection devices of high accuracy have traditionally been composed of materials such as mercury cadmium telluride ($Hg_{(1-x)}Cd_xTe$) which have operated at cryogenic temperatures and thus have always required complicated cooling systems. Recently, however, arrays of very small, sensitive bolometer devices capable of detecting infrared (IR) and millimeter or microwave (mm) energy have been developed which are capable of operating at ambient temperatures. Such an array, in the form of a monolithic integrated focal plane array, which is sensitive to several wavelength ranges of interest is exemplified by the disclosure of U.S. Pat. No. 4 654 622 to Foss, et al.

Such devices have heretofore not been adapted for use in the missile or projectile target acquisition and homing systems. The so-called silicon microbridge sensors, however, are solid-state in nature and do not require cryogenic cooling; and, it has been discovered that these arrays do not require alternating comparison exposure and so can be used in a staring mode. This eliminates the need for an intermittent shutter (chopper) or rotating filter device. These advantages, together with the solid-state nature of sensors made from microbridge arrays, indicate that they can be subjected to extremely high g forces without harm.

Recently, very compact, biaxially pivoting gimbal mounting systems for carrying and directing the field of view of radiation sensitive seeking devices have also been developed. One such device, known as an "eyeball" gimbal is described in U.S. Pat. No. 4 490 724 to Bickman. That system discloses an arrangement in which the drive and measurement components for both the outer gimbal and the inner gimbal are mounted on the frame. This provides maximum space within the gimbals for a sensor, simplifies the determination of the inner gimbal angulation and allows compact operation with respect to inner and outer gimbal rings.

It is also known to digitize a stream of analog pixel array data, or the like, and process it into very high resolution digital images within a field of view. Representative techniques are illustrated and described in U.S. Pat. No. 4 220 972 to Geokezas, et al., U.S. Pat. No. 4 519 041 to Fant, et al., and U.S. Pat. No. 4 561 104 to Martin.

Much research has been carried out in an effort to make such systems more versatile and able to stand more adversity in launch and flight and yet reduce the cost of such systems to thereby reduce the cost of fired projectiles. However, there remains a need for a low-cost, versatile, high resolution target acquisition seeking system for projectiles capable of operating in a very high g environment.

SUMMARY OF THE INVENTION

The present invention provides a relatively low cost, high resolution precision target acquisition and tracking system capable of operation on nonspinning ballistic munition projectiles, or the like. The system includes an imaging IR sensor head which is preferably gimbal mounted but may be mounted in a strapdown mode. The sensor head utilizes an ambient temperature operating, densely packed, two dimensional focal plane array of electromagnetic radiation infrared sensitive (IR) sensors. The array is adapted to operate in a staring mode and a small amount of thermal stabilization is provided to minimize signal processing electronics complexity. A signal processing electronics module is included with stabilizing self-calibrating image processing capabilities. This is combined with a high speed, high resolution real-time focal plane array readout system to produce real-time, high resolution target images. The images are processed in a control and discriminating tracking system which identifies, targets and initiates tracking to impact on a selected target.

The preferred embodiment is one which is adapted to be carried in the nose of a low or high-g launched ballistic projectile. The sensor head includes a high density electromagnetic (infrared) sensitive solid-state microbolometer or microbridge focal plane array which functions as a two-dimensional passive sensor to receive input focused by a suitable optical system through a low distortion infrared energy transmissible radome cover exposed some time after launch. An ambient temperature thermal stabilization system together with a non-uniformity compensation system (NUC) provide self-calibration and correction capabilities. The sensor head also includes the necessary amplifier systems, analog to digital (A/D) and digital to analog (D/A) devices. The data produced by the sensor head system is processed by high speed, high resolution image framing in a real-time target image processor for identifying, locking-on and tracking of targets determined to be of interest. The high resolution framing is also used as an input to the non-uniformity correction including contrast and bright value adjustments and dead pixel removal.

The system is capable of periods of sequential imaging in a staring mode. The system is capable of searching across an area beneath the flight path of the projectile which may be 1200×500 meters and resolving a possible target as small as 0.3 m.

BRIEF DESCRIPTION OF THE DRAWINGS

In the drawings, wherein like numerals are utilized to designate like parts throughout the same.

DETAILED DESCRIPTION

The details of a representative embodiment of the invention will next be described in conjunction with the several drawings.

Figure 1:
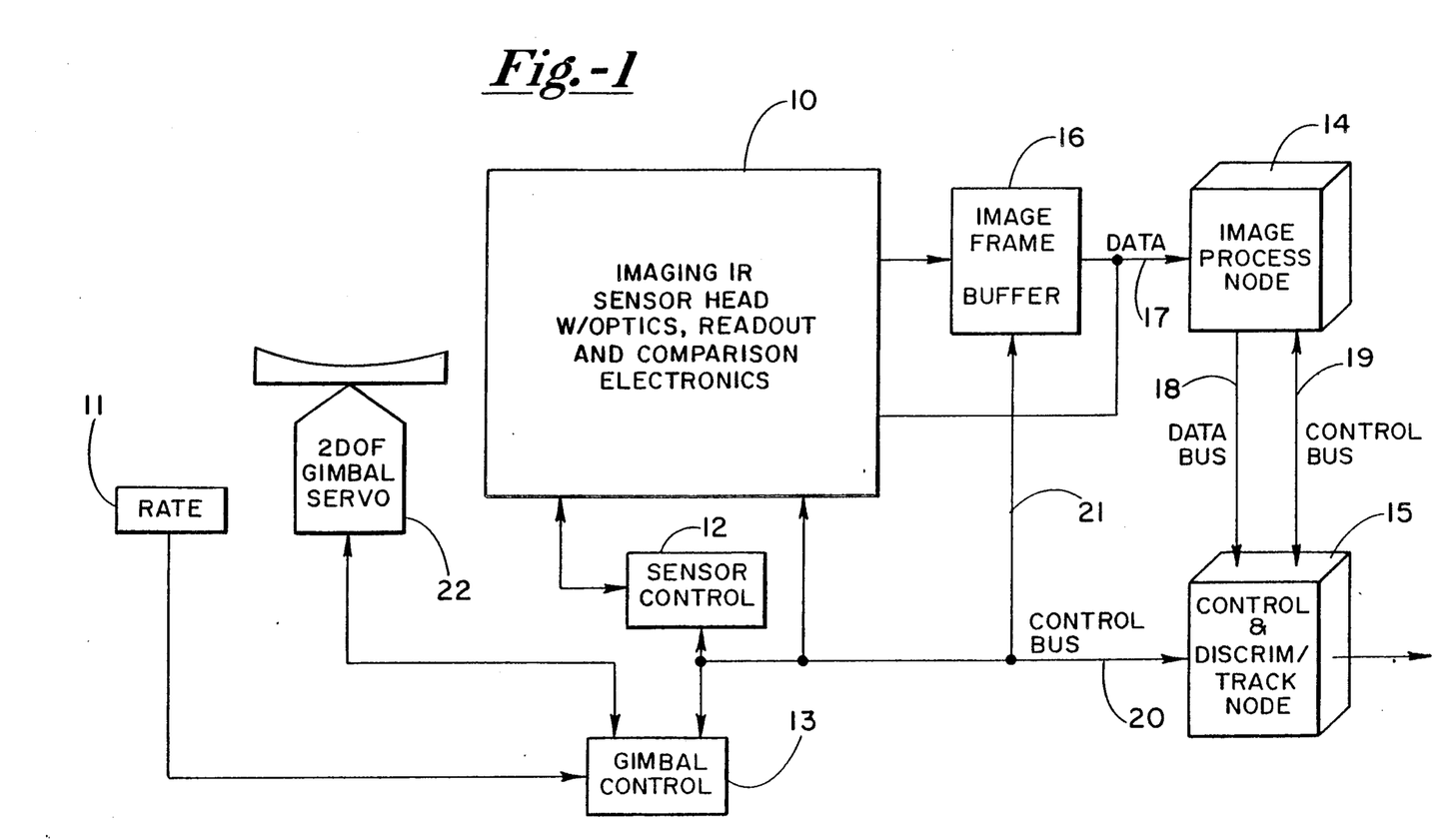
FIG. 1 is a schematic block diagram of the seeker system of the invention.

FIG. 1 is a basic functional diagram of the tactical focal plane array (FPA) seeker of the invention. The imaging sensor head is shown generally by the block 10 and holds the optics elements, a spectral filter, the detector array, the readout and the necessary analog-to-digital and digital-to-analog electronics. The sensor head further includes a thermal stabilization system and preprocessor electronics which include a non-uniformity (NUC) processing system. This section of the entire system is treated in detail below with reference to FIGS. 2, 4 and 5.

In addition, the seeker system contains azimuth and elevation angle rate sensors, as indicated at 11, for inertial stabilization of the sensor head, and sensor and gimbal control interface processor is configured into a high-speed, real-time image processing node 14 and a lower-speed control and decision processing node 15 in which acquired targets identified can be referenced to change the seek or acquisition mode of operation to a tracking/homing mode. Data is fed from the imaging sensor head to an image frame buffer 16 from which data is transmitted via a data bus 17 to the high-speed image processing node 14. The high-speed image processing node 14 is connected with the lower-speed control and discriminator/track node 15 by a data bus 18 and a control bus 19, and control bus 20 provides input to the control and discriminating track node block from the control sensor 12 and gimbal control 13, which also communicates with the image frame buffer 16 via bus 21. The gimbal control 13 is further connected in a two-way mode with the gimbal servo system 22 which operates a gimbal (FIG. 2) with two degrees of freedom (DOF) on which the imaging sensor head is mounted, if desired. The high-speed image processing node 14 provides the real-time, frame image processing functions needed in both the target acquisition or discrimination and the track operating modes.

Figure 2:
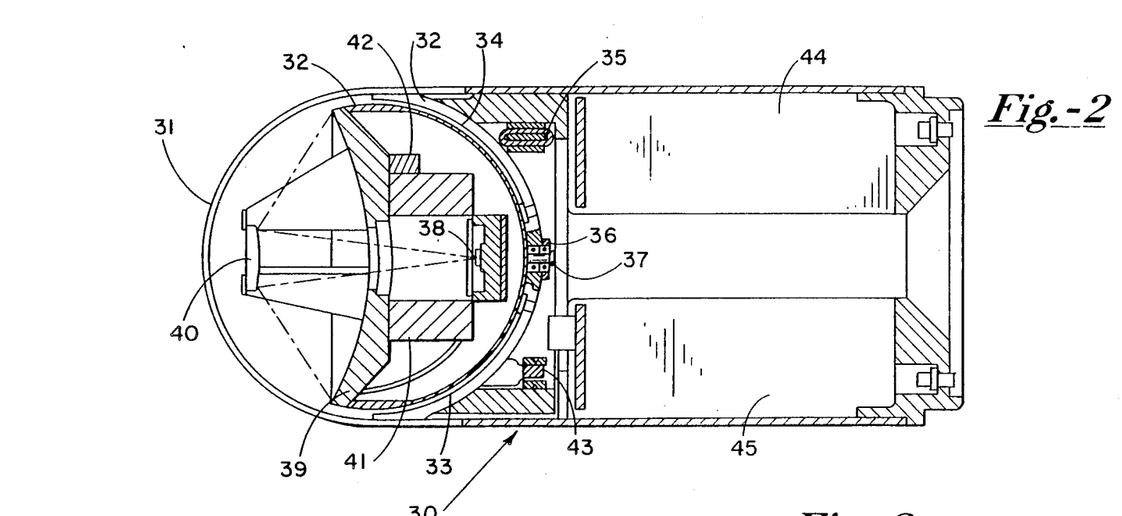
FIG. 2 is a view, partially in section, of a seeker device in accordance with the invention as it might be carried in the nose portion of a sophisticated munition projectile.

FIG. 2 depicts a view, partially in section, of the seeker device of the invention as it might be carried in the nose portion of a sophisticated munition as a gimbal mounted device. The system is one which is approximately 5 inches in diameter and 11 inches long such that it will fit, for example, inside the nose portion of a 155 mm autonomous, precision guided munition projectile carrier and is shown generally at 30. The seeker system is mounted behind a radome or infrared energy transmissible cover 31 which may be made of a zinc sulfide (ZnS) or other such material. The radome cover material is characterized by low optical transmission loss and low distortion. The cover is located behind the ballistic ogive nose and is normally exposed by the ejection of the ballistic nose cover system (not shown) which may separate and be ejected much in the manner of a conventional discarding munition sabot sometime after launching and normally close to the proposed target area.

The illustrative embodiment includes a gimbal assembly system, depicted at 32, which is typically structured such that a plus or minus 30° search volume in any direction can be accommodated. The gimbal system provides essentially two separate functions for the focal plane array seeker. First, the sensor line of sight (LOS) scanning or stepping during search and track can be controlled by a gimbal system. Secondly, inertial pointing stabilization during the stare time is provided to isolate the focal plane array sensor from platform vibrations. The so-called "eyeball" gimbal system consists of the simple hemispherical housing 32 carried and supported in a load bearing socket as at 33. The symmetrical shape and mass distribution enables this design to be inherently adaptable to survive very high g launches such as those associated with high velocity artillery projectiles. Gun launch may involve as much as 18,000 g's and a spin up to 300 revolutions per second. The system further includes an azimuth coupling 34, torque motor 35, elevation coupling 36 and drive pin 37. Details of the assembly and operation of the eyeball gimbal device as mentioned above are more fully described in the above referenced Bickman patent and, as necessary, such further details may be deemed incorporated by reference in this specification.

Cassegrain optics are used to focus the infrared or other electromagnetic radiant energy of interest on the detector array at the back of the eyeball gimbal moving head at 38. The system is quite versatile and suitable for high g operation. It includes a main or primary radiation gathering parabolic reflector surface 39 which is associated with a secondary focusing lens system 40. A suitable spectral filter such as a bandpass filter can also be provided to pass the infrared, millimeter wave or other band of interest and thereby simplify the optics design. On-gimbal readout electronics 41 surround the optical pathway. A two-axis rate sensor for sensing azimuth elevation and angle rates is shown at 42 and an angle signal pick off at 43. A conventional flexible cable (not shown) connects the detector signal output and the sensor output to the signal processor boards at 44 and 45 located behind the gimballed focal plane array system.

Figure 3:
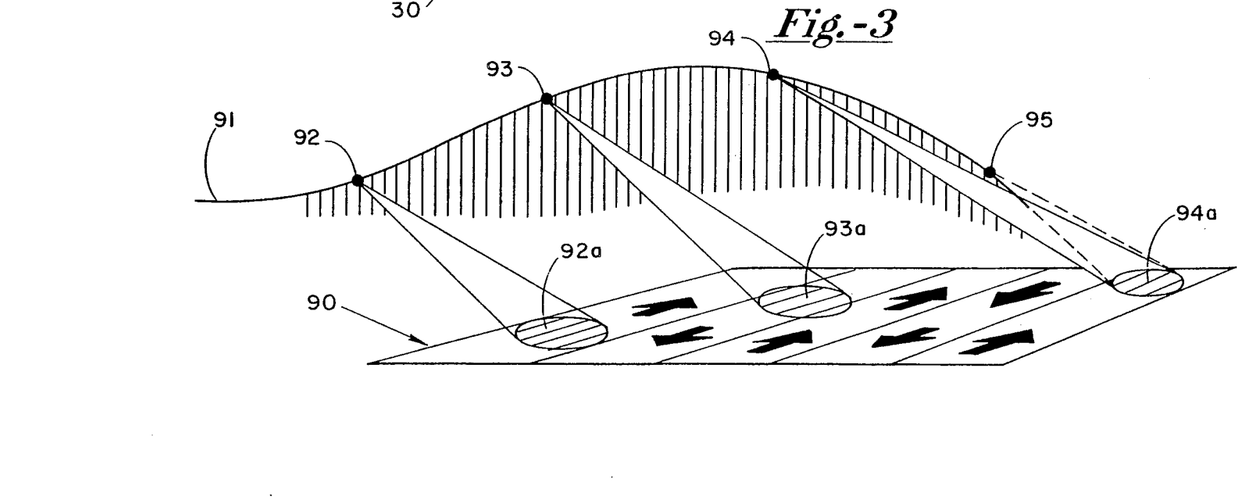
FIG. 3 illustrates a seeker step-stare footprint within a given search area.

Details of the FPA appear as indicated throughout the specification; however, some description of the workings of such an array are believed pertinent. The array typically includes a plurality of low-mass, patterned, individual thermal elements fabricated on a single crystal silicon substrate coated with a thin layer of electrically insulating materials such as silicon dioxide or silicon nitride. Etched openings are provided in the silicon beneath the insulating layer wherever a sensing element is located to provide almost complete thermal isolation for each patterned sensor element from its support structure. In this manner, the sensors become suspended from the structure either as cantilevers or in a "microbridge" fashion as shown in FIG. 3 of Foss, et al. The material of the elements is selected to be characterized by a temperature dependent resistance coefficient so that each element in effect acts as an independent bolometer when exposed to heating electromagnetic radiation. Each sensor element is sufficiently small in size so that, if each sensor represents one image pixel, a high resolution array can be contained in a small, typically 2cm$^2$, chip area. To the extent details of such an array are required to complete any description in this specification, material from the above-referenced Foss, et al. patent is deemed incorporated by reference herein.

As will be discussed later in conjunction with FIGS. 4 and 5, an on-gimbal A/D converter transforms the stream of detector element signals into digital words which are then processed by the digital non-uniformity compensation electronics and stored in the frame buffer 16 (FIG. 1) in digital form for subsequent image processing. In this manner, the system can utilize low noise analog electronics on the gimbal, near the focal plane array chip 38 and use digital signal flex wire connections between the gimbal and the signal processing system. Thus, although the signal processing boards, or the like, represented by 44 and 45 are shown as being quite close to the imaging sensor head, they may be remotely located somewhere else in the munition projectile and connected by the wires.

Figure 4:
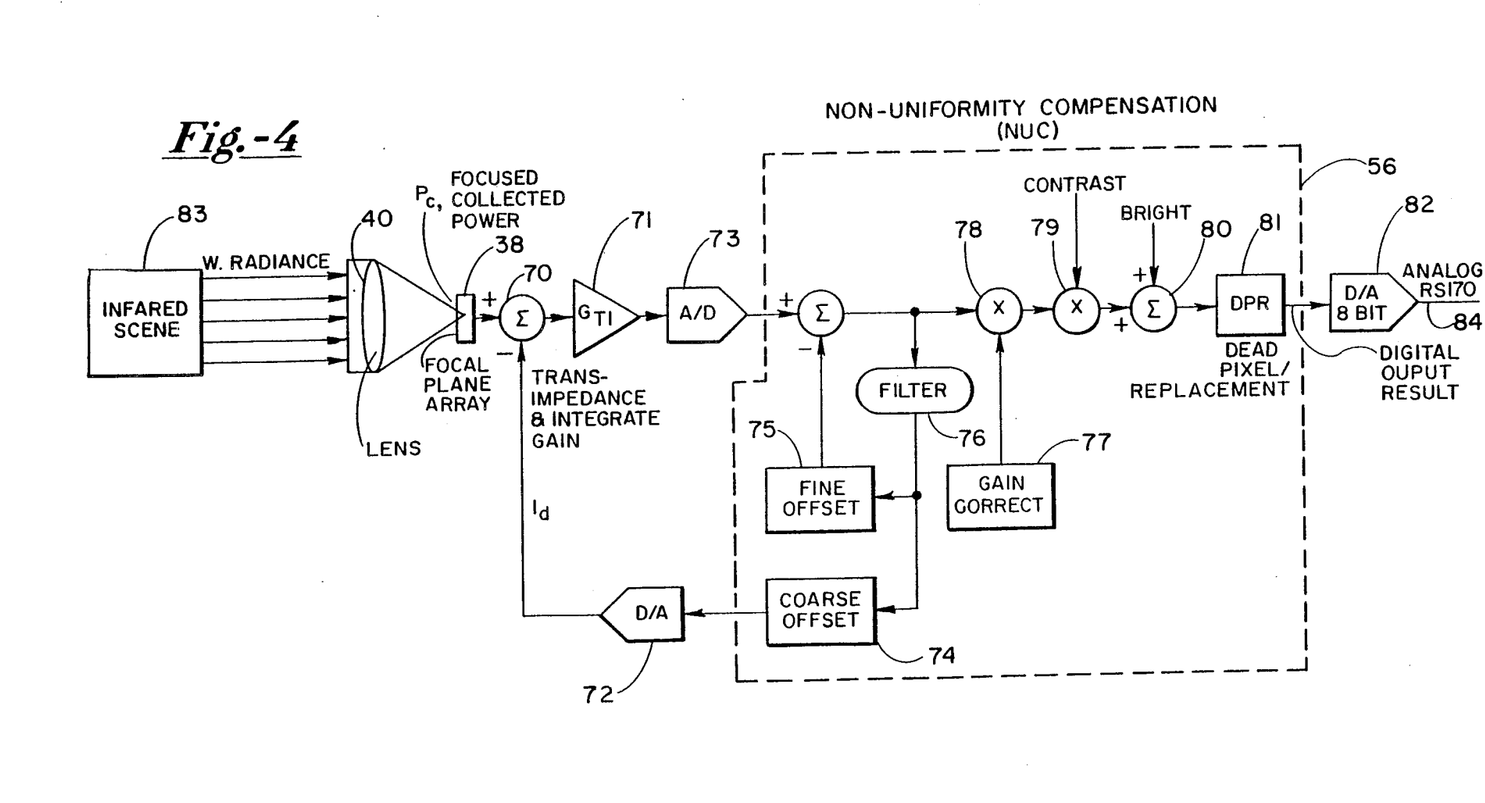
FIG. 4 is a schematic functional block diagram of the sensor head of the seeker device of the invention illustrating ambient operating temperature adaption and non-uniformity compensation.
Figure 5:
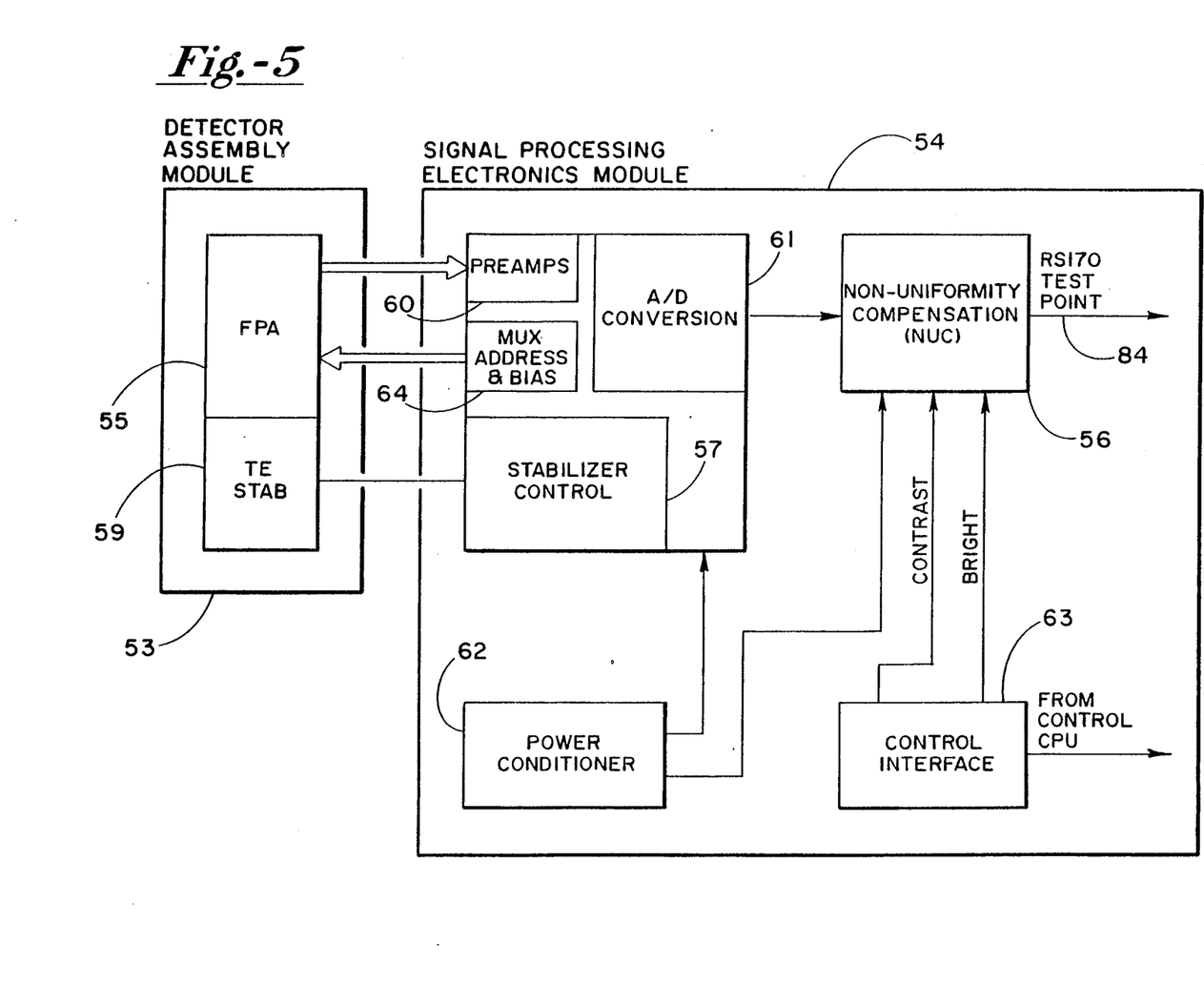
FIG. 5 is a schematic mechanization block diagram of the sensor head of the seeker device of the invention.

FIG. 5 is a schematic mechanization block diagram of the sensor head of the invention. The modules of the sensor head include lens assembly 39, 40, the detector assembly module 53 and the signal processing electronics module 54. The focal plane array system (FPA) 55 is discussed in greater detail in conjunction with FIGS. 2 and 4 and includes everything associated with the movable sensor head. The digital NUC processing and power conditioning electronics are located off the gimbal.

The signal processing electronics module includes non-uniformity compensation (NUC) at 56 which is discussed in greater detail in conjunction with FIG. 4.

A stabilizer control 57 is provided to control stabilization of the temperature of the focal plane array. In this regard, it should be noted that the focal plane array itself may include typically a 256×256 uncooled microbolometer FPA based on silicon chip technology, discussed above. The system is designed to operate in an electromagnetic band of interest, such as the 8-12 micron passband. It may also be configured to operate in the 3-5 micron band in order to maximize performance under the conditions to be encountered. The FPA is DC coupled to the FPA electronics and its output is sensitive to ambient temperature fluctuations. Such temperature fluctuations in the ambient temperature of the FPA itself cause short-term brightness changes in the output. Therefore, some means must be provided to stabilize the temperature of the FPA. While temperature compensation can be provided by adding additional image averaging and filtering electronics, an alternative and less expensive method, currently, is to provide a thermal electric (TE) stabilizer, as at 59, which is operated based on temperature sensed by a temperature sensor to control the ambient temperature of the FPA. In this manner, the array may be stabilized at a convenient ambient temperature such as 24° C. (75° F.).

It should be noted that the extremely small mass of the focal plane array utilizing the microbolometer system allows temperature stability to be achieved with very small amounts of power. Also, in some applications a modest cooling mode in addition to or in lieu of the heating mode might be required. Test results indicate that steady state power consumption for stabilizing the FPA is about 12 milliwatts per ° F. for cooling and about 6 milliwatts per ° F. for heating. The difference derives from relative differences in the efficiencies of the heating and cooling systems.

Additional elements of the signal processing electronics module 54 include the FPA bias voltage supplies and FPA address multiplexers illustrated in block 64, preamplifiers 60 and digital conversion circuitry 61. These are generally conventional circuits. The FPA bias voltage supplies, for example, may be derived from Zener voltage references utilizing a voltage divider chain and noise bandwidth filters. The FPA address multiplexers normally take encoded pixel addresses from the NUC processor 56 and convert them into column and row drive signals for the FPA. A power conditioner 62 is provided to distribute power from a primary power source, which may be a conventional thermal battery or the like, to run the system of the seeker of the invention. A control interface which receives control signals from the seeker control CPU is depicted at 63.

FIG. 4 depicts additional details in a schematic functional block diagram of the amplifier electronics and non-uniformity compensation system. The preamplifier and amplifier electronics include a summation amplifier 70 which, in turn, feeds the FPA signal to a transimpedance amplifier $G_{TI}$ which amplifies the output of the FPA at a very high gain. Before doing this, however, the supplied FPA bias current is subtracted off the FPA output to avoid saturating the $G_{TI}$. This is accomplished by a D/A converter 72, whose input is set by the NUC processor coarse offset memory value learned by a successive approximation technique, discussed below. The $G_{TI}$ then amplifies the FPA pixel signal, plus the residual bias current, which is equal to a quantitization step of an A/D. The A/D converter 73 provides digitized raw pixel input words to the non-uniformity compensation (NUC) system and which eventually become digitized, high resolution image pixels. The non-uniformity compensation (NUC) system receives input from the A/D converter 73, which is normally a flash converter having an 8 or 12 bit word length. The preamplification system also normally includes noise circuit it (not shown) and sample and hold circuits are also provided in conventional fashion.

Non-uniformity compensation (NUC) is the process by which variations in the array are compensated for by electronic means. Variations are caused by both manufacturing anomalies (static) and ambient temperature variations (dynamic). NUC processing provides a uniform output for all pixels derived from microbolometer elements looking at a uniform temperature source in the field of view.

The imaging system is a DC coupled system which requires that the focal plane array DC offsets be compensated for prior to the preamplifier gain. Coarse and fine offset compensations represented by blocks 74 and 75, respectively, are employed. Both of these functions represent learned processes and both take place just prior to ejecting the ballistic ogive nose cone with the nose cone acting as a closed shutter of uniform temperature. In this manner, the coarse offset learning process takes place first, followed by the fine offset learning process. The course offset learning process adjusts the analog offset in the first analog stage through the digital-to-analog means 72. The initial derived value is stored into all pixel offset storage locations, and the compensation process is performed on each pixel in the array. The process is performed on each pixel in parallel so that every pixel in a frame is at the same step in the approximation process. Maintaining all pixels of a frame at the same step in the approximation process allows the course offset compensation to be accomplished (learned) in less than 15 frames, or one-half second.

The fine offset adjustment learning process consists of averaging of 16 consecutive frames of data. The filter 76 smooths and reduces the noise levels of the fine and coarse memory values. After learning is completed, the ogive nose cone is ejected and the stored offset values are subtracted from the corresponding pixels in the array before further processing.

To fully compensate the non-uniformity of the array, pixel-by-pixel gain adjustment is also required. This is accomplished by using an 8×8 digital multiplier 77, 78. The multiplicand is the pixel data and the multiplier is the corresponding gain for that pixel. The individual gains for the array are determined in the manufacturing and screening process and are stored in a pixel gain read only memory (ROM), which is designated "gain correct", at 77 for use by the NUC processing function. Similarly, contrast and bright functions are performed at 79 and 80 based on control signals sent from the seeker control CPU.

The output of each sensor element of the two-dimensional bolometer array then becomes a pixel for each ultimate frame. Production of the array inevitably produces some defective bolometers which yield blank spots or "dead" pixels. The defective microbridge bolometers are recorded during the screening process. This information allows the NUC processing at 81 to replace the dead pixel with a nearest neighbor good pixel. This process eliminates the appearance of speckled that hot or cold areas in the field of view. The output of the system is indicated at 82 as a digital pixel word stream. The RS170 output 84 is a test point for displaying the image on a laboratory TV monitor or recording on a conventional VCR.

With respect to the image processing of the stream of pixels produced from the two-dimensional focal plane array of bolometers into the high resolution imaging necessary for accurate target identification, material from the above-referenced U.S. Pat. No. 4 220 972 to Geokezas, et al., U.S. Pat. No. 4 519 041 to Fant, et al., and U.S. Pat. No. 4 561 104 to Martin may be deemed to be incorporated by reference herein to the extent such is required to provide greater detail.

FIG. 3 is the representation of an operational target search and track of a focal plane array seeker guided munition. Normally, the target search begins when the munition or submunition is established in a horizontal or substantially horizontal glide trajectory over a predetermined target sector, as at 90. The FPA seeker generally has a field of view of about 5°. If the sensor head is mounted on a 2-degree of freedom gimbal, as described above, which provides inertial stabilization, this increases the range of the 5° field of view a great deal, as the gimbal possibly has 30° of movement in each of two directions. The seeker then generally operates in a step-stare mode using the gimbal to step over a plus or minus 30° azimuth scan angle coverage.

In this manner, the FPA seeker will typically start target search at a slant range of 600 to 1000 meters and an altitude between 200 and 300 meters. Using horizontal glide with the seeker scanning search area provides a larger target search area, i.e., 500×1200 meters, than the vertical attack mode which would limit the area to approximately 400×500 meters. In this manner, if the glide path is represented by 91 in FIG. 3, scan frames can be represented from 92, 93, 94 and 95 as 92a, 93a and 94a. When a target is acquired at 94a, the seeker will lock on the target and guide the projectile so that at 95, the target is still in view as the munition homes on the target. The infrared FPA seeker will seek out targets based on both heat content and two-dimensional geometric shape in this manner, because the pixel resolution of the frame is such that two-dimensional shapes as small as 0.3 to 0.5 meter may be resolved in the FOV at an altitude of several hundred meters.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications can be accomplished without departing from the scope of the invention itself.

We claim:

1. An infrared (IR) sensitive seeker system for gimballed or non-gimballed mounting on a ballistic projectile capable of withstanding relatively high g forces and operating in a staring mode, the seeker system comprising:

an imaging IR sensor system having a two-dimensional focal plane array (FPA) of ambient temperature operable IR sensors, wherein each sensor in the array has a baseline output is adapted to receive radiation and produce a temperature related analog output therefrom, the system including digitizing means for digitizing the analog output and which collectively produces an output in the form of a digital stream of data;

optical system to cause incoming IR to be focused on the FPA:

signal amplification and analog to digital conversion means to initially process the output from the sensors;

high speed, high resolution real-time imaging system to produce sequential real-time high resolution frames based on the sequential output of the two dimensional array;

high speed, high resolution real-time image processing means to extract target features; and control and discrimination means to utilize high resolution target feature image data to control the sensor and image framing and identify targets of interest and cause the ballistic projectile to track and approach identified targets of interest.

2. The seeker system of claim wherein the IR sensing system is further characterized by an array of microbridge bolometer sensors.

3. The seeker system of claim 1 wherein the real-time, high resolution frames are pixel images, the pixels of which are each derived from a different sensor in the array.

4. The seeker system of claim 1 further comprising means for compensating for non-uniformity in the array baseline output.

5. The seeker system of claim 2 wherein the real-time high resolution frames are pixel images, the pixels of which are each derived from a different one of the microbridge bolometer sensors.

6. The seeker system of claim 5 in which the array baseline output further includes means which provide a uniform output for all pixels derived from microbridge bolometer sensors looking at a uniform temperature source in a field-of-view.

7. The seeker system of claim 1 further comprising compensation circuitry and algorithms to adapt to an arbitrary baseline temperature.

8. The seeker system of claim 1 further comprising means for stabilizing the baseline temperature of the array to the seeker ambient temperature.

9. The seeker system of claim 1 wherein the FPA is gimbal mounted.

10. The seeker system of claim 3 wherein the FPA is gimbal mounted.

11. The seeker system of claim 6 wherein the FPA is gimbal mounted.

12. The seeker system of claim 2 further characterized by a Cassegrain optics system to focus the received radiation onto the focal plane array.

13. The seeker system of claim 6 further characterized by a Cassegrain optics system to focus the received radiation onto the focal plane array.

14. The seeker system of claim 11 further characterized by a Cassegrain optics system to focus the received radiation onto the focal plane array.

* * * * *

UNITED STATES PATENT AND TRADEMARK OFFICE
CERTIFICATE OF CORRECTION

PATENT NO. : 5 129 595

DATED : July 14, 1992

INVENTOR(S) : Edwin C. Thiede et al

It is certified that error appears in the above-identified patent and that said Letters Patent is hereby corrected as shown below:

In column 9, line 17, after "claim", insert -- 1 -- .

In column 9, line 20, delete ",".

Signed and Sealed this

Thirty-first Day of August, 1993

*Attest:*

BRUCE LEHMAN

*Attesting Officer*     *Commissioner of Patents and Trademarks*